United States Patent Office 3,330,416
Patented July 11, 1967

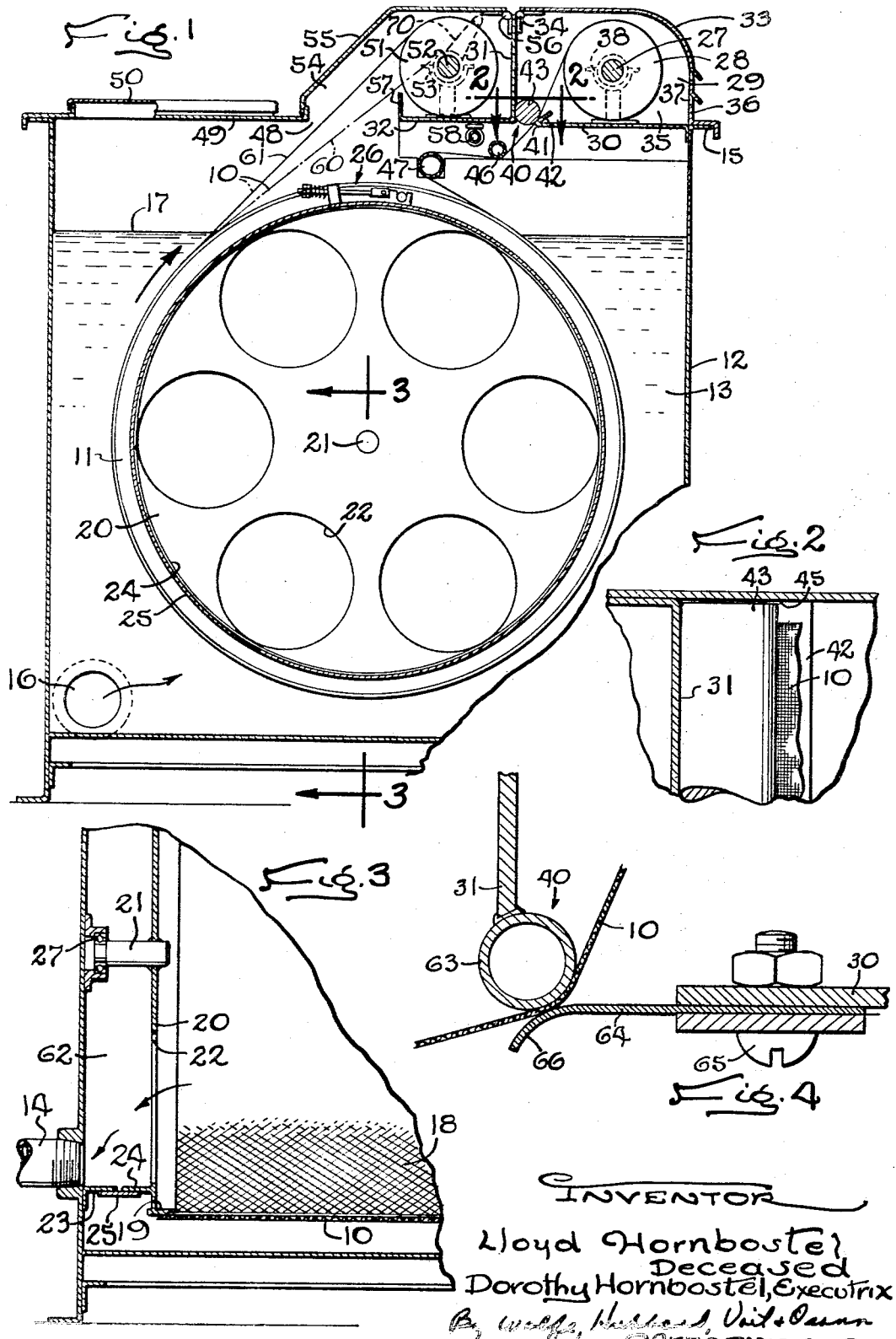

3,330,416
PERFORATED DRUM TYPE LIQUID FILTER
Lloyd Hornbostel, deceased, late of Beloit, Wis., by Dorothy Hornbostel, executrix, 1638 Emerson St., Beloit, Wis. 53511
Filed Mar. 23, 1965, Ser. No. 442,211
4 Claims. (Cl. 210—387)

This invention relates to liquid filters of the type shown in Patent No. 2,752,045 in which a flexible filter sheet travels from a supply roll to a take-up roll around a rotary perforated drum partially submerged in the liquid to be filtered, the filtrate being removed through the interior of the drum and said rolls being disposed outside of a body of unfiltered liquid in a tank enclosing the drum.

The primary object is to adapt the patented filter for improved efficiency of operation when treating liquids such as heated oil susceptible to volatilization and condensation on cool portions of the filter.

A more detailed object is to effectually isolate the supply roll and the adjacent inward length of the filter medium from vapors rising from the body of unfiltered liquid.

Other objects and advantages of the invention will become apparent from the following detailed description taken in connection with the accompanying drawings, in which FIGURE 1 is a vertical sectional view of a filter embodying the novel features of the present invention.

FIG. 2 is a fragmentary sectional view taken along the line 2—2 of FIG. 1.

FIG. 3 is a fragmentary section taken along the line 3—3 of FIG. 1.

FIG. 4 is a fragmentary section similar to FIG. 1 showing a modification.

The improved filter shown in the drawings for purposes of illustration comprises generally an elongated flexible filter sheet 10 extending partially around a perforated drum 11 rotatably mounted within a tank 12 containing the liquid 13 to be filtered by gravitation through the sheet 10 into the interior of the drum from which the filtrate is drained through an outlet 14 (FIG. 3). The tank is of generally square box-like construction somewhat deeper than the diameter of the drum and having a peripheral flange 15 around its upper end. The fluid 13 to be filtered is delivered into the tank through an inlet 16 and the rate of flow is suitably controlled so as to maintain the liquid at a normal level 17 near the top of the tank.

Herein, the drum 11 comprises a rigid perforated cylinder covered by a suitable screen 18 with its opposite ends telescoping with and secured to cylindrical flanges 19 on two circular disks 20. The latter, which constitute ends of the drum, are rigid with trunnions 21 projecting axially and outwardly and journaled in bearings 27 supported in opposite side walls of the tank. The drum is thus adapted to turn about a horizontal axis so disposed that with the liquid at the level 17 all except a small segment at the top of the drum is submerged.

One of the disks is imperforate so as to close one end of the drum. Holes 22 angularly spaced around the other disk establish communication between the interior of the drum and the outlet chamber formed by cylindrical flanges 23 and 24 on the tank wall and drum end. The chamber is closed by a band 25 tightened around the flanges by a device 26.

The filter medium 10 which may be composed of woven fabric or other porous material is wide enough to cover the full perforated length of the drum and is an elongated sheet wound around a shaft 27 to form a supply roll 28, which in accordance with the present invention is disposed above the tank in a compartment 29 isolated from the oil vapors that tend to accumulate in the top portion of the tank, condense and become deposited on cooler surfaces that may be contacted. The bottom wall of the compartment comprises a horizontal plate 30 rigid with one side wall of the tank at the top thereof and extending across the full length of the tank and partially across the top thereof. One side wall of the compartment comprises a plate 31 rigid with and upstanding from a horizontal cross-plate 32 which is disposed at the same level as and spaced a short distance from the inner edge of the bottom plate 30. The top and three remaining walls of the compartment are formed by a box-like cover 33 hinged at 34 along the upper edge of the plate 31 and having depending side walls 35 and 36 whose lower edges in the closed position of the cover as shown in FIG. 1 rest on the upper ends and one side of the tank flange 15. The compartment is vented through holes 37 in the wall 36.

Opposite ends of the shaft 27 project beyond the ends of the supply roll and are removably journaled in bearings 38 supported in the walls 35 of the cover. By swinging the latter upwardly about the hinge 34, the supply roll and shaft may be exposed for removal of the shaft and replacement of the roll.

To prevent vapors from the top of the tank from migrating into the compartment, the filter web is led off from the inner side of the supply roll downwardly and out of the compartment through a slot-like bottom opening 40 while being sealed against the defining edges of this opening. The latter extends along the full length of the compartment 29 which corresponds to the width of the filter cloth. In the form shown in FIGS. 1 and 2, this opening is defined by the upright lower edge portion of the wall 31 and a bend 41 at the end of an upwardly inclined flange 42 formed by bending the inner edge portion of the bottom wall 30 reversely.

Sealing of the opening while allowing the web to advance freely therethrough may be effected in various ways, by leading the web downwardly across the flange and beneath a free floating roller 43 resting on top of the web as backed by the flange and also against the opposed face of the wall 31. The roller which is preferably composed of lightweight material such as wood and is of relatively small diameter so that with the roller resting on the web above the relatively shallower incline 42 and against the wall 31, it will roll freely as the web is pulled downwardly by turning of the drum. The roller is only slightly shorter than the length of the chamber 29 leaving at the roller ends such a narrow clearance 45 that little upper leakage of oil vapors can take place.

Below the opening 40, the web extends straight toward and around a stationary cross-bar 46, then horizontally to the top of and reversed around a bar 47. The bars 46 and 47 span the walls of the tank and are fixed at their ends to the latter. The bar 47 is spaced above the drum and to the right of the axis thereof so that the web, when led reversely and tangentially onto the drum, contacts the latter along a line somewhat above the level 17.

After passing around the drum, the web extends tangentially off from the drum above the liquid level 17 and then out of the tank through an opening 48 between the inner end of the plate 32 and a plate 49 covering the remainder of the tank and supporting a removable cover 50. Above the liquid, the dirty web extends through the opening 48 directly onto a take-up roll 51 on a shaft 52 which is removably journaled at opposite ends in bearings 53 on opposite end walls 54 of a box-like cover 55 hinged at 56 to the upper edge of the plate 31 and resting at its free edge on the inner edge of the top plate 49. By swinging the cover upwardly, the take-up roll may be exposed for removal from the shaft. Oil draining off from the dirty web or by condensation of vapors in the take-up roll compartment accumulates in a trough defined by the plate 32 and a flange 57 thereon and escapes through a drain outlet 58.

It will be observed that when the winding of the take-up roll is started, the web extends along a line 60 and along a line 61 when the roll is full. Thus, in all degrees of the winding, the full length between the drum and roll is free of contact with any part so that there is no possibility of rubbing off any of the filtered-out material or pressing the same into the pores of the web.

In operation of the filter, the liquid to be filtered is delivered to the tank at a rate correlated with the filtering capacity of the submerged part of the filtering medium 10 so as to maintain the tank filled substantially to the level 17. At the same time, the take-up roll 51 is turned usually intermittently as by means of a crank 70 to wind up the used part of the filter medium and to turn the drum clockwise thereby drawing a corresponding amount of the clean sheet off from the supply roll 28. Since the lowermost part of the drum interior is drained continuously through the chamber 62 and the outlet 14, the substantial head of the unfiltered liquid operates by gravity to force the liquid through the cloth over substantially the entire submerged area thereof. The filtering action thus proceeds continuously and entirely by gravity thus contributing to the overall simplicity of the filter construction irrespective of the capacity of the filter.

It will be observed that the filter cloth extends from its final point of contact with the drum tangentially upwardly and laterally and directly through the opening 48 onto the take-up roll 51 in all degrees of filling of the latter. That is to say, no guiding of the web between the drum and the take-up roll is required as a result of which the solids filtered out of the oil are retained on the web surface and thus removed from the tank.

As an alternative, the supply roll compartment 29 may be sealed against objectionable leakage of vapors thereto by defining the opening 40 as shown in FIG. 4. A tube 63 is secured to and extends across the lower edge of the upright wall 31 and the web 10 is led downward from the supply roll and around a short arc of the tube. One edge of a thin plate 64 of resiliently yieldable material is clamped by bolts 65 to the inner edge of the cover plate 30 from which the plate projects horizontally and cantilever fashion with its curved free edge 66 urged upwardly to hold the web against the tube. The latter and the plate 64 extend across the full length of the supply roll compartment.

In accordance with another aspect, the present invention contemplates pretreatment of the cloth 10 in a novel and simple manner which effectually prevents any substantial passage into the drum of water which may be carried into the tank in the form of small globules suspended in the dirty oil. This treatment involves coating or impregnating of the fibers of the fabric 10 with a water-repellant which is insoluble in both the oil and water so as to remain on the fabric in the course of its passage into and out of the tank. A material somewhat similar to ordinary automobile wax may be employed, a liquid found to be most satisfactory being a silicone fluid sold by Union Carbide as L45 which is dimethylpolysiloxane.

In operation of the filter using ordinary cloth as the filter web but treated as above described, any small water globules suspended in the oil delivered into the tank end coming against the exterior surface of the cloth will be held there and become combined and agglomerate with other globules to form drops of water which, upon attaining a size sufficient to fall off from the cloth, gravitate to the bottom of the tank since the major area of the filtering surface faces downwardly thereby inducing falling of the released droplets to the bottom of the tank for eventual removal. A more effective purification of the oil is thus achieved.

I claim as my invention:

1. A filter having, in combination, a tank adapted to contain a body of liquid to be filtered, a drum having a perforated periphery mounted within said tank to turn about a horizontal axis, said tank having a top wall with an elongated opening therein extending across the tank above said drum, a take-up roll disposed outside of said tank and supported to turn about an axis paralleling said drum axis, said tank having a second and slot-like top opening horizontally spaced from said first opening, a supply roll mounted outside of said tank to turn about an axis parallel to said take-up roll and said openings, a flexible filter web wound on said supply roll and extending downwardly through said second opening and into said tank, means guiding said web within the tank first tangentially onto said drum above the level of said liquid, downwardly around the drum and upwardly off from the latter onto said take-up roll, means defining said second opening and sealing the passing web against the edges thereof whereby to minimize the escape of vapors upwardly from the tank, through said opening and into contact with said supply roll, said sealing means including a member defining one wall of said second opening, extending across the full length of the opening, and yieldably biased toward said web to hold the same against the opposite wall of the opening.

2. A filter as defined in claim 1 in which said second opening is defined by opposed walls converging downwardly and said web is urged against one of the walls by a free vertically floating roller extending along the full length of the opening.

3. A filter as defined in claim 2 in which the angle included between the opposed walls leading to said second opening is sufficiently large to allow for free turning of said roller as said web is drawn downwardly through the opening.

4. A filter as defined in claim 1 including a rod defining one side edge of said second opening and a resiliently flexible imperforate blade secured cantilever fashion to said tank along the other side of said second opening and having a free edge bearing against said web and pressing the same against said rod whereby to seal the second opening against the escape of vapor out of the tank through such opening.

References Cited

UNITED STATES PATENTS

| Re. 24,430 | 2/1958 | Hornbostel | 210—387 |
| 2,675,129 | 4/1954 | Doubleday | 210—387 |
| 2,823,806 | 2/1958 | Harlan. | |
| 3,107,986 | 10/1963 | Plaut et al. | 55—97 |

FOREIGN PATENTS 974   3/1873   Great Britain.

REUBEN FRIEDMAN, *Primary Examiner.*

J. ADEE, *Assistant Examiner.*